United States Patent
Gutman

[15] 3,692,882
[45] Sept. 19, 1972

[54] CYANODITHIOIMIDOCARBONATE PHOSPHATES

[72] Inventor: Arnold D. Gutman, Berkeley, Calif.

[73] Assignee: Stauffer Chemical Company, New York, N.Y.

[22] Filed: March 9, 1970

[21] Appl. No.: 17,954

[52] U.S. Cl..................260/940, 71/87, 260/453 R, 260/502.6, 260/973

[51] Int. Cl...........................C07f 9/08, A01n 9/36
[58] Field of Search......................260/940

Primary Examiner—Joseph Rebold
Assistant Examiner—Anton H. Sutto
Attorney—Daniel C. Block, Edwin H. Baker and Albert J. Adamcik

[57] ABSTRACT

Novel cyanodithioimidocarbonates are disclosed. The compounds are useful as herbicides.

5 Claims, No Drawings

CYANODITHIOIMIDOCARBONATE PHOSPHATES

BACKGROUND OF THE INVENTION

This invention relates to novel compositions of matter and their use as herbicides. More particularly, this invention relates to certain cyanodithioimidocarbonates, and the use of these materials in killing weeds.

SUMMARY OF THE INVENTION

The compounds of the present invention have the formula:

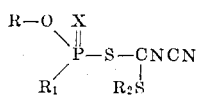

wherein R is alkyl containing one through five carbon atoms; $R_1$ is selected from the group consisting of alkyl containing one through five carbon atoms and alkoxy containing one through five carbon atoms; X is selected from the group consisting of O and S; and $R_2$ is selected from the group consisting of alkyl containing one through five carbon atoms; alkenyl containing two through five carbon atoms, haloalkenyl containing two through five carbon atoms; halobenzyl, benzyl, and $R_3$—S—$R_4$ wherein $R_3$ is alkyl containing one through four carbon atoms, and $R_4$ is selected from the group consisting of —$CH_2$—, —$CH_2CH_2$—. The term "halo" used in describing the present invention encompasses the moieties chloro-, bromo-, iodo-, and fluoro-, and includes poly- as well as mono- substitution. The invention also comprises the use of materials having the above-described formula in novel herbicidal compositions and methods.

In a preferred form, the invention relates to compounds having the formula

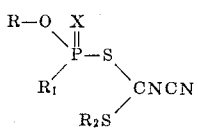

wherein R is alkyl containing one through five carbon atoms; $R_1$ is selected from the group consisting of alkyl containing one through five carbon atoms and alkoxy containing one through five carbon atoms; X is selected from the group consisting of O and S; and $R_2$ is selected from the group consisting of alkyl containing one through five carbon atoms, haloalkyl containing one through five carbon atoms, alkenyl containing two through five carbon atoms, and haloalkenyl containing two through five carbon atoms, and their use as herbicides. In this embodiment, where a "halo"-material is contemplated, the mono- and di-substituted halogen compounds are favored and the halogens are selected from the group consisting of chlorine and bromine.

In its most preferred form, the invention comprises compounds having the formula

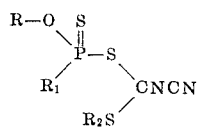

wherein R is alkyl containing one through five carbon atoms; $R_1$ is selected from the group consisting of alkyl containing one through five carbon atoms and alkoxy containing one through five carbon atoms; and $R_2$ is selected from the group consisting of alkyl containing one through five carbon atoms, and mono- and di- haloalkyl containing one through five carbon atoms, and their use as herbicides.

In general, the method of the invention comprises contacting undesired vegetation or a locus to be protected with an effective or herbicidal amount of a composition having the formula above-indicated.

DETAILED DESCRIPTION OF THE INVENTION

Broadly, the compounds of the invention may be prepared according to the following general reactions:

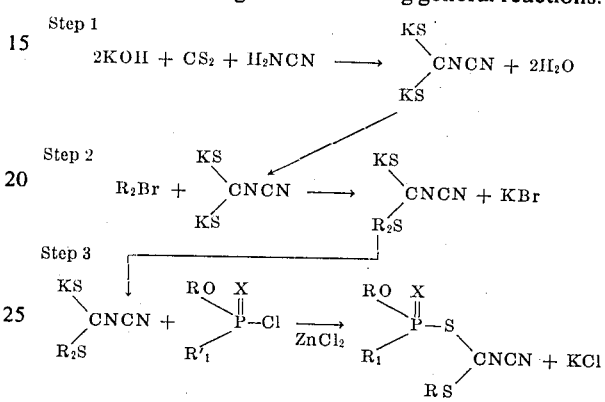

wherein R, $R_1$, $R_2$, and X are as indicated above.

The concentrations of the reactants employed are not particularly critical, although stoichiometry requires, e.g., in Step 1, that about two mols. of KOH be employed per mol. of $H_2NCN$ and $CS_2$. Again, bases other than KOH may be employed, such as NaOH or LiOH. In Step 2, other halides, such as $R_2Cl$ or $R_2I$ may be employed.

The first step is preferably conducted in water, while steps 2 and 3 are carried out in a solvent such as acetone, DMF, DMSO, dioxane, or tetrahydrofuran. In the case of step 1, the reaction is exothermic and thus does not require the addition of heat. Steps 2 and 3 may require heating, step 2 being carried out at a temperature of from about 0° C. to about 40° C., while step 3 is carried out at a temperature of from about 25° C. to about 80° C.

The following examples are provided to demonstrate more fully the preparation of the compounds of the invention. The nomenclature employed is consistent with that used by Timmons et al., Journal of Organic Chemistry, Volume 37, Pages 1566–1572.

EXAMPLE I

Preparation of methyl, (O,O-diethylphosphorothio), cyanodithioimidocarbonate

STEP I

Approximately 8.4 grams (0.2 mol.) $H_2NCN$ dissolved in 15 ml. of ethyl alcohol, and 13.4 ml. of $CS_2$ (0.22 mol.) are added to a five hundred milliliter flask. The mixture and flask are cooled in an ice bath, and 14.5 grams of 85 percent KOH in 35 ml. of ethyl alcohol are added to the flask, with stirring. Upon crystallization, the product, dipotassium cyanodithioimidocarbonate, is separated and washed with alcohol.

STEP II

About 21.5 grams of the dipotassium salt of cyanodithioimidocarbonic acid are dissolved in 88 ml.

of acetone and 98 ml. of $H_2O$, and the solution is cooled to below 0° C. About 14.2 grams of methyl iodide in about 44 ml. of acetone is added dropwise with rapid stirring under nitrogen atmosphere. After the addition is complete, the mixture is stirred for about one-half hour in the ice bath, and about 3½ hours at room temperature. The solution is then evaporated and the residue dried at 50° C. overnight. The residue is then stirred with about 232 ml. of acetone and filtered. The filtrate is evaporated and the residue washed with two 100 ml. portions of diethyl ether and the product, potassium methyl cyanodithioimidocarbonate, is recovered.

STEP III

Approximately 8.5 grams (0.05 mol.) of potassium methylcyanodithioimidocarbonate, about 9.4 grams (0.05 mol.) of O, O-diethylthiophosphoryl chloride, a trace of $ZnCl_2$, and about 200 ml. of acetone are combined in a 500 milliliter flask. The mixture is heated under reflux for two hours and then cooled to room temperature. About 300 ml. of benzene are added, and the mixture is washed with three 100 ml. portions of water. The benzene phase is then dried with anhydrous magnesium sulfate and is evaporated under reduced pressure to yield methyl-(O,O-diethylphosphorothiono)cyanodithioimidocarbonate. $N_D^{30} = 1.5900$.

EXAMPLE II

Preparation of methyl (-O,O-diisopropyl phosphorothiono)cyanodithioimidocarbonate.

The procedure of Example I is repeated, except that O,O-diisopropylthiophosphoryl chloride is employed instead of the O,O-diethylthiophosphoryl chloride.

EXAMPLE III

Preparation of methyl (O-ethyl, ethyl phosphonothiono)cyanodithioimidocarbonate

The procedure of Example I is repeated, except that O-ethyl, ethylthiophosphonyl chloride is employed instead of the O,O-diethylthiophosphoryl chloride.

EXAMPLE IV

Preparation of the ethyl (O,O-diethylphosphoro)cyanodithioimidocarbonate

The procedure of Example I is repeated, except that ethyl iodide is employed instead of the methyl bromide, and O,O-diethylphosphoryl chloride is employed instead of the O,O-diethylthiphosphoryl chloride.

EXAMPLE V

Preparation of allyl (O,O-diethylphosphorothiono) cyanodithioimidocarbonate

The procedure of Example I is repeated, except that allyl bromide is employed instead of the methyl bromide.

EXAMPLE VI

Preparation of 4-chlorobenzyl (O,O-diethylphosphorothiono)cyanodithioimidocarbonate The procedure of Example I is repeated, except that P-chlorobenzyl chloride is employed instead of the methyl bromide.

The following is a table of preferred compounds which may be prepared according to the invention:

TABLE

1. O,O-diethylphosphorothiono, methyl-cyanodithioimidocarbonate
2. O,O-diethylphosphorothiono, allyl-cyanodithioimidocarbonate
3. O-methyl, O-ethylphosphorothiono, methyl-cyanodithioimidocarbonate
4. O,O-diethylphosphorothiono, benzyl-cyanodithioimidocarbonate
5. O-ethyl, ethylphosphonothiono, 4-chlorobenzyl-cyanodithioimidocarbonate
6. O-isobutyl, methylphosphonothiono, butenyl-2-cyanodithioimidocarbonate
7. O,O-diethylphosphorothiono, ethyl-cyanodithioimidocarbonate
8. O,O-diethylphosphorothiono, 2,4-dichlorobenzyl-cyanodithioimidocarbonate
9. O-methyl, methylphosphonothiono, propyl-cyanodithioimidocarbonate
10. O,O-diethylphosphorothiono, 4-chlorobenzyl-cyanodithioimidocarbonate
11. O,O-diethylphosphorothiono, methylthiomethyl-cyanodithioimidocarbonate
12. O-ethyl, ethylphosphonothiono, isobutyl-cyanodithioimidocarbonate
13. O,O-diethylphosphorothiono, 4-bromobenzyl-cyanodithioimidocarbonate
14. O-methyl, O-isopropylphosphorothiono, ethylthiomethylcyanodithioimidocarbonate
15. O,O-diethylphosphorothiono O-chlorobenzyl-cyanodithimidocarbonate
16. O,O-diisopropylphosphoro, methyl-cyanodithioimidocarbonate
17. O,O-dimethylphosphorothiono, methylthiomethylcyanodithioimidocarbonate
18. O,O-diethylphosphorothiono, 1,1-dichloroallyl-cyanodithioimidocarbonate
19. O-ethyl, ethylphosphonothiono, methyl-cyanodithioimidocarbonate As previously indicated, the compositions of the invention are phytotoxic compounds which are useful and valuable in controlling various plant species. In order to demonstrate this valuable utility, O,O-diethylphosphorothiono, methylcyanodithioimodocarbonate was tested as exemplary of the compounds of the invention, as follows:

Seeds of five species including crabgrass, wild oats, mustard, curled dock, and one crop pinto beans (*Phaseolus vulgaris*) are planted about one-half inch deep in sandy loam soil in individual rows in flats. Enough seeds are planted to give 30 to 50 plants of each species per flat, and the flats are watered after planting. The flats are placed in the greenhouse at 70° to 85° F. and watered daily with a sprinkler. About 10 to 14 days after planting, when the primary leaves of the bean plant are almost fully expanded, the first trifoliate leaves are just starting to form, the plants are sprayed. The spray is prepared by weighing out 50 mg. of the test compound, dissolving it in 15 ml. of acetone containing 1 percent Tween 20 -(polyoxyethylene monolaurate), and then adding 5 ml. of water. The solution is sprayed on the foliage using an atomizer. The spray concentration is 0.5 percent and the rate would be approximately 20 lb/acre if all of the spray were retained on the plant and soil. However, since some spray is lost, it is estimated that the application rate is approximately 12.5 lb/acre.

The treated plants are placed back in the greenhouse and care is taken to avoid sprinkling the treated foliage with water for three days after treatment. Water is applied to the soil by means of a slow stream from a watering hose.

Injury rates are recorded 14 days after treatment. A rating of 0 to 10 is given based on estimated injury or kill. The results of this test are reported in Table II.

TABLE II

Rate 20 lbs/A.

| Crabgrass (Digitaris Sanguinalis) | Curled Dock (Rumex Crispus) | Pinto Bean (Phaseolus vulgaris) | mustard (brassica juncea) | wild oats (avera fatua) |
|---|---|---|---|---|
| 9 | 9 | 9 | 6 | 6 |

As can be seen by the test results, the compounds of the invention are useful as herbicides. The compounds may be applied directly to the particular undesired plant species or may be applied to a locus to be protected. In either event, it is, of course, necessary that the unwanted species receive an effective dosage of amount, i.e., an amount sufficient to kill or retard growth.

The compounds are normally employed with a suitable carrier and may be applied as a dust, spray, drench or aerosol. The compounds thus may be applied in combination with solvents, diluents, various surface active agents, (for example, detergents, soaps or other emulsifying or wetting agents, surface active clays), carrier media, adhesives, spreading agents, humectants, and the like. They may also be combined with other biologically active compositions, including other herbicides, fungicides, bactericides and algaecides, insecticides, growth stimulators, acaricides, molluscicides, etc., as well as with fertilizers, soil modifiers, etc. The compounds of the invention may be used in combination with an inert carrier and a surface active or emulsifying agent and may also be applied in combination with other biologically active materials, in conjunction with a carrier and a surface active or emulsifying agent. The solid and liquid formulations can be prepared by any of the conventional methods well-known by those skilled in the art. Determination of the optimum effective concentration for a specific application is readily conducted by routine procedures, as will be apparent to those skilled in the art. As indicated, the amount applied in a given case will be an effective amount, i.e., an amount, i.e., an amount sufficient to give the type of control desired.

Various changes and modifications may be made without departing from the spirit and the scope of the invention described herein, as will be apparent to those skilled on the art to which it pertains.

I claim:

1. A compound having the formula

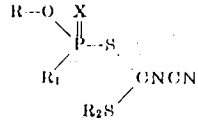

wherein R is alkyl containing one through five carbon atoms; $R_1$ is selected from the group consisting of alkyl containing one through five carbon atoms and alkoxy containing one through five carbon atoms; X is selected from the group consisting of O and S; and $R_2$ is selected from the group consisting of alkyl containing one through five carbon atoms.

2. A compound having the formula

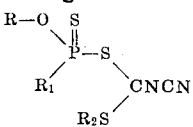

wherein R is alkyl containing one through five carbon atoms; $R_1$ is selected from the group consisting of alkyl containing one through five carbon atoms and alkoxy containing one through five carbon atoms; X is selected from the group consisting of O and S; and $R_2$ is selected from the group consisting of alkyl containing one through five carbon atoms; alkenyl containing two through five carbon atoms and haloalkenyl containing two through five carbon atoms.

3. The compound of claim 2 wherein X is S, $R_2$ is selected from the group consisting of alkyl containing one through five carbon atoms.

4. The compound of claim 3 wherein R is ethyl, $R_1$ is ethoxy, X is S, and $R_2$ is methyl.

5. The compound of claim 3 wherein R is methyl, $R_1$ is isopropoxy, X is S, and $R_2$ is ethyl.

* * * * *